Figure 1:
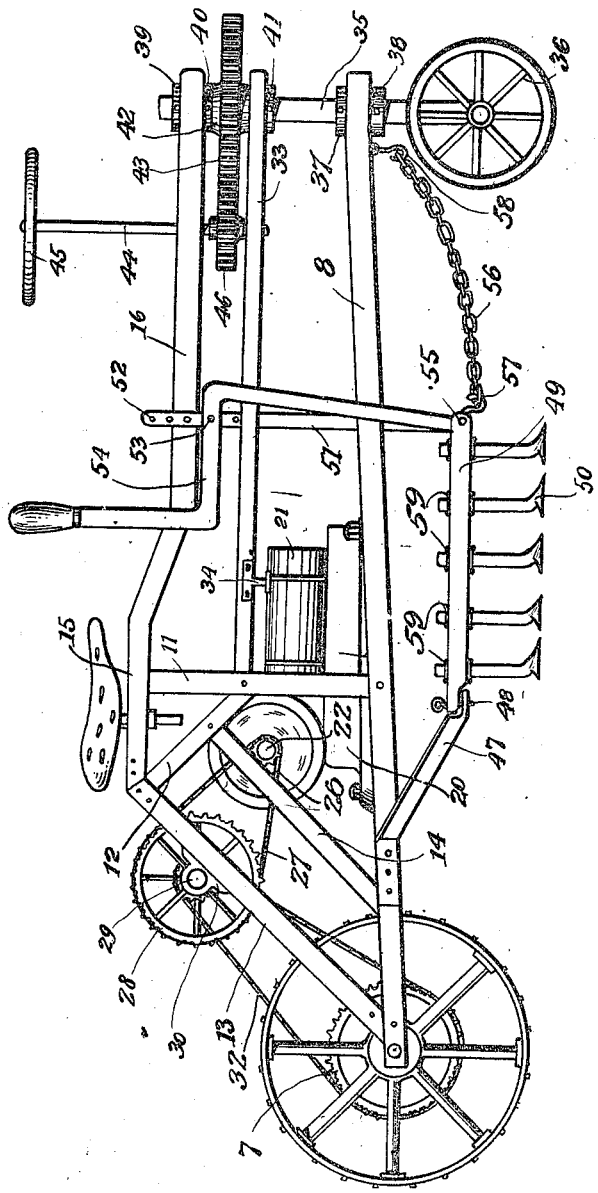

M. SAMEL.
AGRICULTURAL MACHINE.
APPLICATION FILED JULY 31, 1914.

1,154,888.

Patented Sept. 28, 1915.
2 SHEETS—SHEET 1.

WITNESSES
Frank Riedl
Max H. Srolowtz

INVENTOR
Michael Samel
By Henry C. Evert
ATTORNEY

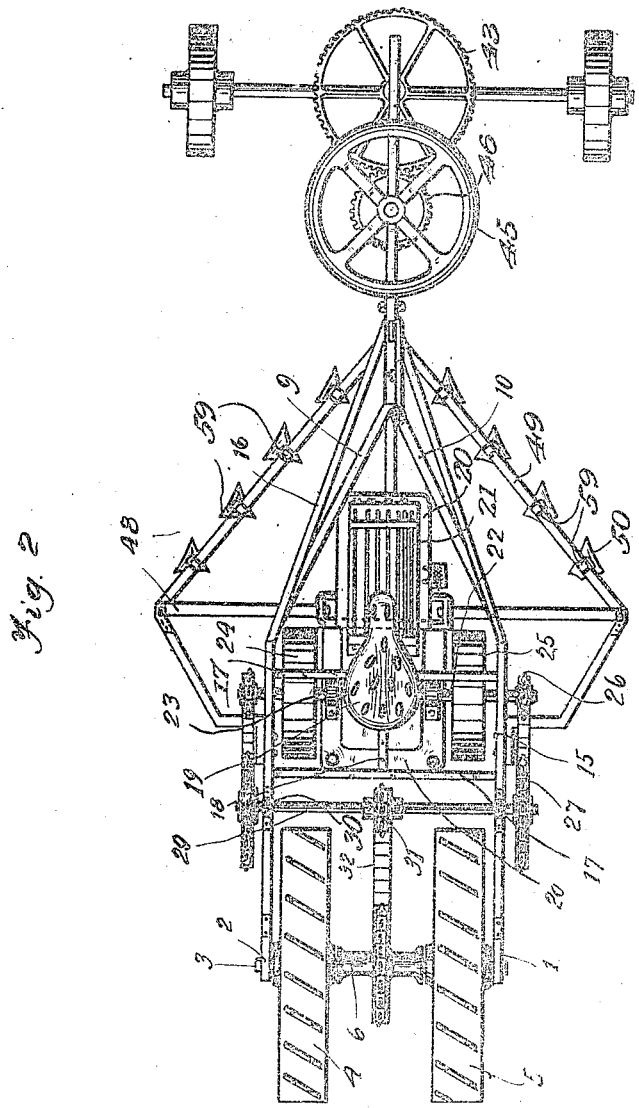

UNITED STATES PATENT OFFICE.

MICHAEL SAMEL, OF LORAIN, OHIO.

AGRICULTURAL MACHINE.

1,154,888.    Specification of Letters Patent.    Patented Sept. 28, 1915.

Application filed July 31, 1914. Serial No. 854,367.

*To all whom it may concern:*

Be it known that I, MICHAEL SAMEL, a subject of the King of Hungary, residing at Lorain, in the county of Lorain and State of Ohio, have invented certain new and useful Improvements in Agricultural Machines, of which the following is a specification, reference being had therein to the accompanying drawing.

This invention relates to an agricultural machine and has for its object to provide a machine of such class, carrying means for propelling the same and to further provide the machine with a triangular shaped frame carrying a series of ground working tools capable of being adjusted to their operating position.

Further objects of the invention are to provide an agricultural implement which is comparatively simple in its construction and arrangement, strong, durable, efficient and convenient in its use, readily set up and comparatively inexpensive.

With the foregoing and other objects in view the invention consists of a novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—Figure 1 is a side elevation of an agricultural machine in accordance with this invention. Fig. 2 is a top plan view.

Referring to the drawings in detail, 1 and 2 denote a pair of parallel members, having journaled in their lower ends an axle 3, carrying a pair of tractor wheels 4 and 5. Fixed to the axle 3, between the wheels 4, 5, is a hub 6, and a sprocket wheel 7.

Reference character 8 denotes the main bar of a machine frame and which is disposed centrally with respect to the members 1 and 2 and extending to near the forward end of said members 1 and 2. The forward ends of the members 1 and 2 are disposed inwardly at an inclination at 9 and 10 and are connected to the bar 8.

Projecting upward from each of the members 1 and 2, forward thereof, is an upright 11, which has extending rearwardly thereof at an upward inclination a bar 12, the latter being secured to a rearward extending and downwardly inclined bar 13. Depending from the bar 12 at an inclination is an inclined bar 14. The bars 13 and 14 are secured to their respective members 1 or 2. Leading forward from the bars 13 are longitudinally disposed members 15 which terminate in members 16. The members 15 are secured together by transverse members 17, which are connected together by a longitudinal member 18. The latter constitutes a support for a seat 19.

Supported by the bar 8 and members 1 and 2 is a base 20 for gas engine 21. The engine 21 drives a crank shaft 22, mounted in bearings 23, and provided with fly wheels 24, and 25. The crank shaft 22 projects outwardly from each side of the machine frame and each of the projecting ends of said shaft has a sprocket pinion 26, connected by a chain 27 to a sprocket wheel 28, carried by shaft 29, mounted in bearings 30 and secured to the bars 13. Shaft 29 is provided with a sprocket pinion 31, which is connected to the sprocket wheel 7 by a sprocket chain 32, whereby when the engine 21 is operated the traction wheels 4 and 5 will be propelled.

The reference character 33 denotes a longitudinally extending member, arranged parallel of member 16, and the lower portion of the member 33 is a support for the engine 21 as at 34.

Extending up through the bar 8, members 16 and 33 is a steering post 35, carrying on its lower end a steering wheel 36. The post 35 is provided with collars 37 and 38 to arrest vertical movement of the post 35 with respect to the bar 8 and said post 35, is further provided with collars 39, 40 and 41 to arrest vertical movement of the post 35 with respect to the members 16 and 33. Mounted upon the post 35 and interposed between the members 33 and collar 40 is a hub 42 and a gear wheel 43.

Journaled in the members 16 and 33 is a shaft 44 provided with a handle 45 at the top thereof, and said shaft 44 between the members 16 and 33 carries a pinion 46, which meshes with the gear wheel 43.

Projecting outwardly from each of the members 1 and 2 is an inclined support 47, and the said supports depend below the member 8 and are braced by a transverse bar 48, and detachably connected to the support 47 by the bar 48, is an angular shaped frame 49 provided with ground working tools 50. The connections between the frame 49 and the supports 47 are such as to enable the frame 49 to be elevated when the occasion so requires. Connected to the frame 49 and extending up through the member 33, as well as the bar 8, is a vertically disposed rod 51 provided with a series of openings 52, whereby the pivot 53 of a shifting member and lever 54 can be adjustably connected to said rod. The member 54 is connected to the frame 49 as at 55.

The ground working tools or instruments are substantially triangular in design and are held to the frame 49 by means of yokes or other similar devices 59.

What I claim is:—

An agricultural implement comprising a frame, propelling means therefor, steering means therefor, a pair of downwardly outwardly and forwardly inclined supports secured to the sides of said frame, an angularly shaped frame engaged at one end with said supports, one bar of said frame being extended vertically and provided with registering openings and a lever connected to the angular frame and adjustably connected to said bar and capable of elevating and lowering the frame, ground working implements, and yokes for securing the ground working implements to the frame.

In testimony whereof I affix my signature in the presence of two witnesses.

MICHAEL SAMEL.

Witnesses:
 B. CASPER,
 T. H. SZUNZSGIII.